C. W. WIDNEY.
HEADLIGHT.
APPLICATION FILED DEC. 13, 1915.
1,209,240.
Patented Dec. 19, 1916.
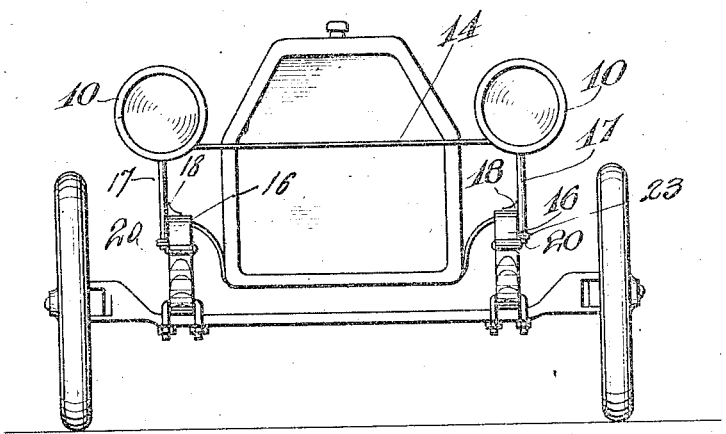
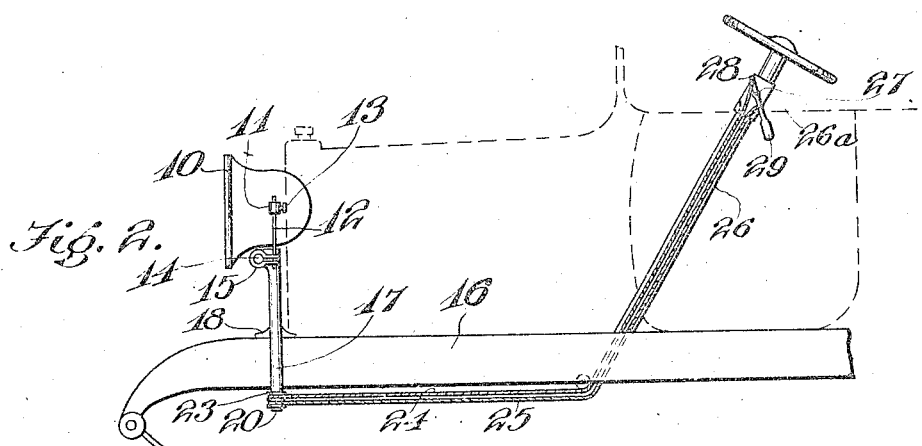
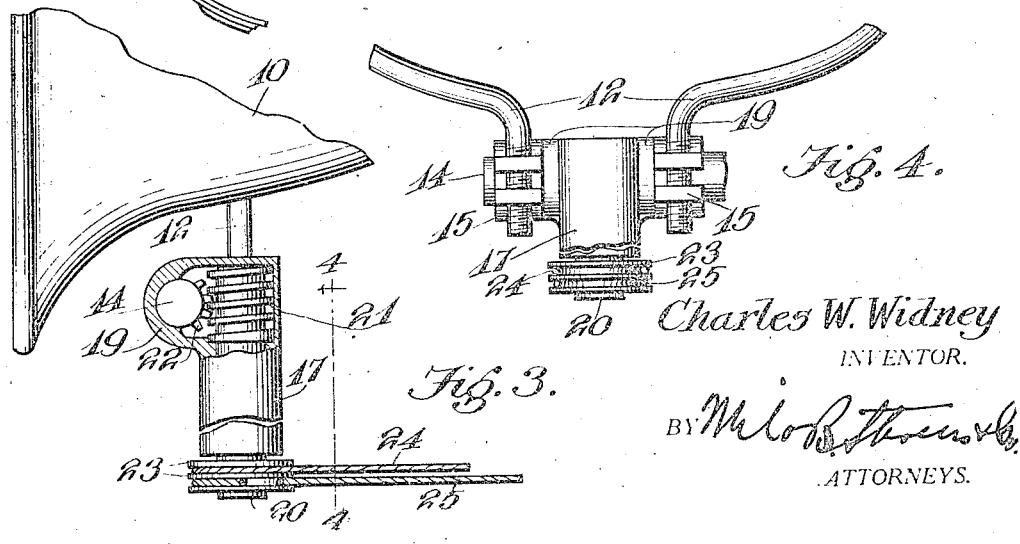
Charles W. Widney
INVENTOR.
BY
ATTORNEYS.

UNITED STATES PATENT OFFICE.

CHARLES W. WIDNEY, OF MELROSE PARK, ILLINOIS.

HEADLIGHT.

1,209,240.　　　　Specification of Letters Patent.　　Patented Dec. 19, 1916.

Application filed December 13, 1915.　Serial No. 66,528.

*To all whom it may concern:*

Be it known that I, CHARLES W. WIDNEY, a citizen of the United States, residing at Melrose Park, in the county of Cook and State of Illinois, have invented new and useful Improvements in Headlights, of which the following is a specification.

This invention relates to head lights employed on automobiles and other vehicles, and its object is to provide a support for the head lights which enables the latter to be set in such a position as to relieve the driver of an oncoming car or other vehicle of the confusing glare of the lights, and to effect this without dimming or shutting off the lamps.

The object sought is obtained by mounting the head lights so that they can be tilted downward to project the light downward to a point on the road a relatively short distance ahead of the car.

The invention also has for its object to provide a simple and efficient mechanism for effecting the operation stated, and a construction whereby the head lights are held steady and securely locked in the position they may be set.

In order that the invention may be better understood, reference is had to the accompanying drawing, in which—

Figures 1 and 2 are, respectively, front and side elevations, showing the application of the invention to an automobile; Fig. 3 is an enlarged elevation of a detail, partly in section and broken away, and Fig. 4 is a vertical section on the line 4—4 of Fig. 3.

Referring specifically to the drawings, 10 denotes the two head lights of a motor car or other vehicle. On the side of the lamp body are lugs 11 having perforations to receive the upper ends of bracket arms 12, the lamps being fixed on said arms by set screws 13 threaded through the lugs to engage the bracket arms. A horizontal rock-shaft 14 extends between the lamps and carries the bracket arms, the connection between the shaft and the bracket arms being made by suitable clamps 15. The lamps are thus rigidly mounted on the rock-shaft, and upon rocking the latter, the lamps are tilted so that the beam of light may be projected straight ahead, or inclined downward onto the road to a point a short distance ahead of the car.

On the side bars 16 of the car frame are mounted upright bearings 17, said bearings being secured to the side bars by means of lateral wings 18. At the upper ends of these bearings are horizontal bearings 19 which support the rock shaft 14. In one of the bearings 17 is mounted a shaft 20 having at its upper end a worm 21. The shaft 14 intersects the worm, and has teeth 22 in mesh therewith, the bearing 19 being designed to locate the shaft 14 so that its teeth may mesh with the worm. At its lower end, the shaft 20 projects from the bearing 17, and has a double grooved pulley 23. In one of the pulley grooves is secured and lies a cord 24 and in the other pulley groove a cord 25, the two cords being wound in opposite directions. Thus the shaft 20 may be rotated in either direction by a pull on the proper cord.

On the steering post 26 of the car, or on any suitable and convenient part is mounted a plate 26ᵃ on which is fulcrumed, at 27, a lever 28, to the respective ends of which the cords or lines 24 and 25 are made fast. The lever has a handle 29 to facilitate its operation.

In operation, to tilt the head lights 10, it is necessary only to swing the lever 28, whereby, through the lines 24 and 25, the shaft 20 is turned, and through the worm gearing, the shaft 14 is rocked. As a slight movement of the shaft 14 suffices to tilt the head lights, but few teeth 22 are required. The worm gearing holds the lamps steady in all positions and they will remain securely locked in the position set.

The mechanism described is simple in construction and efficient in operation, and it effectually serves the purpose for which it is designed.

I claim:—

The combination of a pair of vehicle headlights having supporting brackets, upright bearing members carried by the vehicle and having horizontal bearings, a horizontal rock shaft supported in said horizontal bearings, means for fixing the aforesaid lamp brackets to the rock shaft, a rotatable shaft mounted in one of the upright bearing members and having a worm, the rock shaft being provided with teeth which are in mesh with said worm, and actuating means for the rotatable shaft.

In testimony whereof I affix my signature.

CHARLES W. WIDNEY.